No. 747,118.                                              Patented December 15, 1903.

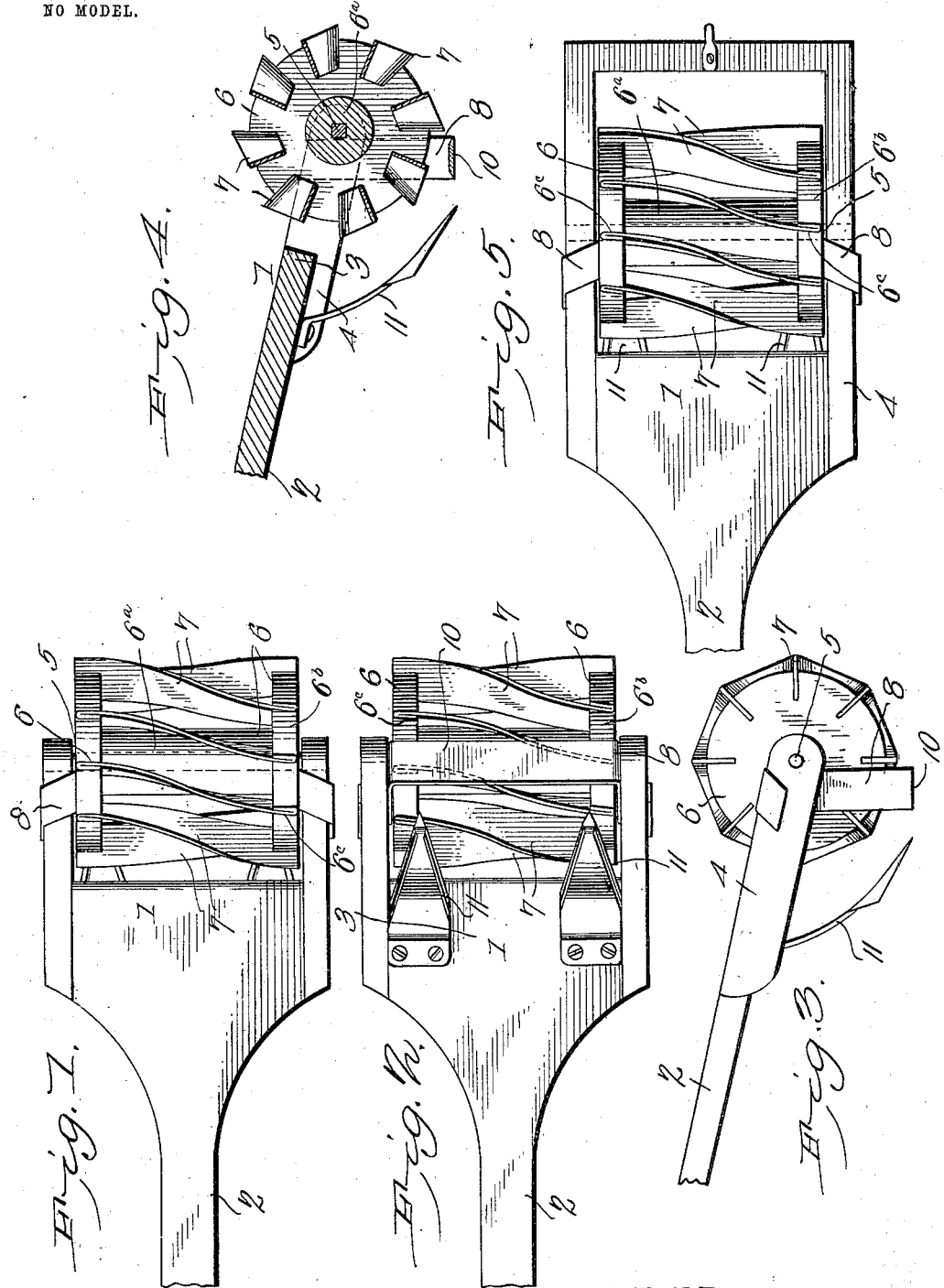

UNITED STATES PATENT OFFICE.

CLARENCE I. J. BARKER, OF DAVID CITY, NEBRASKA.

CULTIVATOR AND WEED-EXTERMINATOR.

SPECIFICATION forming part of Letters Patent No. 747,118, dated December 15, 1903.

Application filed August 6, 1903. Serial No. 168,505. (No model.)

*To all whom it may concern:*

Be it known that I, CLARENCE I. J. BARKER, a citizen of the United States, residing at David City, in the county of Butler and State of Nebraska, have invented a new and useful Cultivator and Weed-Exterminator, of which the following is a specification.

This invention relates to an improved device which is for the purpose of killing and exterminating weeds and for at the same time cultivating or tilling the soil, it being specially adapted for beet, onion, and garden cultivation, although it may be obviously used for any purpose for which it may be found adapted.

My improved cultivating device comprises, besides a frame of suitable construction, a reel journaled in said frame and having a plurality of obliquely-disposed knives or cutters, a flat knife or cutter permanently connected with the frame and forming a yoke which extends under the rotary reel, and one or more cultivator-blades, which may be suitably attached to and connected with the under side of the frame. The latter or the entire tool may be made in various sizes, either adapted to be drawn by draft-animals when used in the field or to be pushed by hand when used for garden cultivation, the general characteristics of the device being in all cases preserved.

In the accompanying drawings I have shown a simple and preferred form of embodiment of my invention, it being understood, however, that I reserve to myself the right to any changes, alterations, and modifications as to size, shape, or exact manner of assemblage of the parts or members of the device which may be resorted to within the scope of my invention and without departing from the spirit or sacrificing the efficiency of the same.

In said drawings, Figure 1 is a top plan view of my improved device adapted to garden cultivation by hand. Fig. 2 is a bottom plan view of the same. Fig. 3 is a side elevation. Fig. 4 is a vertical transverse section. Fig. 5 is a top plan view illustrating a modification.

Corresponding parts in the several figures are indicated by similar numerals of reference.

The frame of my device is composed of a body or block 1, which is provided with a handle 2. Said body is provided with rearwardly-extending arms 3 3, portions of which extend downwardly to form flanges 4. In the outer ends of the arms 3 3 is journaled a shaft 5, carrying a reel 6, the heads of which are connected by a plurality of obliquely-disposed knives or cutters 7. This reel is composed of a cylindrical body 6$^a$, having heads 6$^b$, preferably integral therewith, and said heads are provided with radial slots or grooves 6$^c$, adapted to receive the ends of the obliquely-disposed cutter-blades 7, the ends of which latter are doubled upon themselves, so as to engage and be safely retained in the said slots.

8 designates a yoke made of sheet-steel, the upper end of the arms of which engage the arms 3, abutting against the inner sides of the latter and bent over the upper edges and outer sides of the latter so as to form a perfect connection therewith, screws or bolts being employed in order to effect a perfect fastening or connection. The lower part of the yoke, which is designated 10, forms a knife or cutter the edge or edges of which are sharpened, so that they will readily cut into the soil, under the surface of the latter, thereby cutting the roots of all plants that it may come in contact with.

The part of my invention which has thus far been described constitutes what I prefer to term a "weed cutter and exterminator." When the device in operation is pushed over the ground by means of the handle 2, the edge of the cutter 10 will engage the soil and cut under the surface of the latter. The obliquely-disposed blades 7 of the reel will engage the stumps or stalks of the plants on the surface and will perform the double function of cutting or chopping the latter and also of so holding them and forcing them against the cutting edge of the blade 10 as the latter progresses under the soil as to cause the said blade inevitably to sever the roots, thereby killing the plants.

When my device is to be used additionally as a cultivator, cultivating-blades 11 of suitable construction are to be mounted upon the under side of the block or body, as will be clearly seen in the drawings hereto annexed. These blades may be of any desired construction, shape, or character and may be used for simply furrowing the soil or for turning the furrows in any desired direction. These blades are attached to the under side of the block or body 1, adjacent to the flanges 4, depending from the side pieces or arms 3, said flanges serving to reinforce the said blades and to maintain them in proper position. These attachments will be mostly employed when the device is intended to be operated by animal-power. When this is the case, it is obvious that means must be provided for attaching draft at the front end of the device, which latter may then be guided by means of the handle 2. This modification has been illustrated in Fig. 5 of the drawings hereto annexed.

From the foregoing description, taken in connection with the drawings hereto annexed, the operation and advantages of my invention will be readily understood and duly appreciated by those skilled in the art to which it appertains. The construction of the device is extremely simple, and it may be produced at a trifling expense. Whether used as a garden-tool or on a larger scale for cultivating in the fields it will perform the duties required of it in a simple and perfect manner.

Having thus described my invention, I claim—

1. In a device of the class described, the combination of a frame-block, arms extending forwardly from the same, said arms being also extended downwardly to form flanges, a yoke connected with said arms and constituting a cutter, a reel journaled between the arms, a plurality of obliquely-disposed cutters forming part of said reel, and cultivating-blades secured to the under side of the frame-body and abutting against the flanges formed by the arms adjacent thereto.

2. A device of the class described comprising a frame-block having a handle, arms extending forwardly from said frame-block, a yoke carried by said arms, a reel journaled between said arms and having obliquely-disposed cutters, and cultivating devices connected with the frame-block in rear of the reel.

In testimony that I claim the foregoing as my own I have hereto affixed my signature in the presence of two witnesses.

CLARENCE I. J. BARKER.

Witnesses:
JOHN M. ZENTZ,
L. E. DOTY.